United States Patent
Rueger et al.

(10) Patent No.: US 10,289,466 B2
(45) Date of Patent: May 14, 2019

(54) ERROR DATA COLLECTION IMPROVEMENTS IN STORAGE NETWORK COMPONENTS

(71) Applicant: International Business Machines Corporation, Armonk, NY (US)

(72) Inventors: Erik Rueger, Ockenheim (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/421,663

(22) Filed: Feb. 1, 2017

(65) Prior Publication Data

US 2018/0217887 A1  Aug. 2, 2018

(51) Int. Cl.
*G06F 11/00* (2006.01)
*G06F 11/07* (2006.01)

(52) U.S. Cl.
CPC ...... *G06F 11/0775* (2013.01); *G06F 11/0703* (2013.01); *G06F 11/076* (2013.01); *G06F 11/0727* (2013.01); *G06F 11/0757* (2013.01); *G06F 2201/88* (2013.01)

(58) Field of Classification Search
CPC ............... G06F 11/076; G06F 11/0727; G06F 11/0757; G06F 11/0703; G06F 11/0787; G06F 11/079
See application file for complete search history.

(56) References Cited

U.S. PATENT DOCUMENTS

| | | | |
|---|---|---|---|
| 7,103,711 B2 | 9/2006 | Valdevit | |
| 7,571,356 B2 | 8/2009 | Inoue et al. | |
| 7,620,855 B2 | 11/2009 | DeCenzo et al. | |
| 7,844,863 B2 | 11/2010 | Hathorn et al. | |
| 7,904,752 B2 | 3/2011 | Hood et al. | |
| 7,913,108 B1 * | 3/2011 | French | G06F 11/0793 714/24 |
| 8,566,637 B1 * | 10/2013 | Puhov | G06F 11/0727 714/42 |
| 8,996,925 B2 | 3/2015 | Halverson et al. | |

(Continued)

OTHER PUBLICATIONS

"Managing Error Logging", IBM Corporation, IBM Knowledge Center, http://www.ibm.com/support/knowledgecenter/en/ssw_aix_71/com.ibm.aix.genprogc/managing_error_log.htm, retrieved from the internet Sep. 7, 2016, 3 pages.

(Continued)

*Primary Examiner* — Charles Ehne
(74) *Attorney, Agent, or Firm* — Francis Lammes; Stephen J. Walder, Jr.; Robert M. Sullivan

(57) ABSTRACT

A mechanism is provided for improving error data collection in a storage network component. Each time an associated error code generated by a device coupled to the storage network component occurs, each error counter in a set of error counters associated with the error code generated by the device in the storage network component is incremented and the error is legged in an error log area associated with the device in the storage network component. Responsive to one or more clip levels in a set of clip levels being met, a notification associated with the one or more clip levels that are met is triggered thereby causing the error associated with the device to be addressed. The set of clip levels is associated with the error log area and each error counter in the set of error counters associated with the error code generated by the device.

20 Claims, 5 Drawing Sheets

(56) References Cited

U.S. PATENT DOCUMENTS

2011/0185268 A1\* 7/2011 Matsushige ......... G06F 11/0727
                                                  714/819
2014/0173368 A1\* 6/2014 Collins ................ G06F 11/073
                                                  714/704
2017/0286206 A1\* 10/2017 Fischer-Toubol ...........................
                                                  G06F 11/0793

\* cited by examiner

ERROR DATA COLLECTION IMPROVEMENTS IN STORAGE NETWORK COMPONENTS

BACKGROUND

The present application relates generally to an improved data processing apparatus and method and more specifically to mechanisms for improving error data collection in storage network components.

A storage network, such as a storage area network (SAN), Internet Small Computer System Interface (iSCSI), converged infrastructure, or the like, is a network that provides access to consolidated, block level data storage. Storage networks are primarily used to enhance storage devices, such as disk arrays, tape libraries, and optical jukeboxes, accessible to servers so that the devices appear to the operating system as locally attached devices. A storage network typically has its own network of storage devices that are generally not accessible through the local area network (LAN) by other devices.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for improving error data collection in a storage network component. Each time an associated error code generated by a device coupled to the storage network component occurs, the illustrative embodiment increments each error counter in a set of error counters associated with the error code generated by the device in the storage network component and logs the error in an error log area associated with the device in the storage network component. The illustrative embodiment triggers a notification associated with one or more clip levels that are met in response to the one or more clip levels in a set of clip levels being met, thereby causing the error associated with the device to be addressed. In the illustrative embodiment, the set of clip levels is associated with the error log area and each error counter in the set of error counters associated with the error code generated by the device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
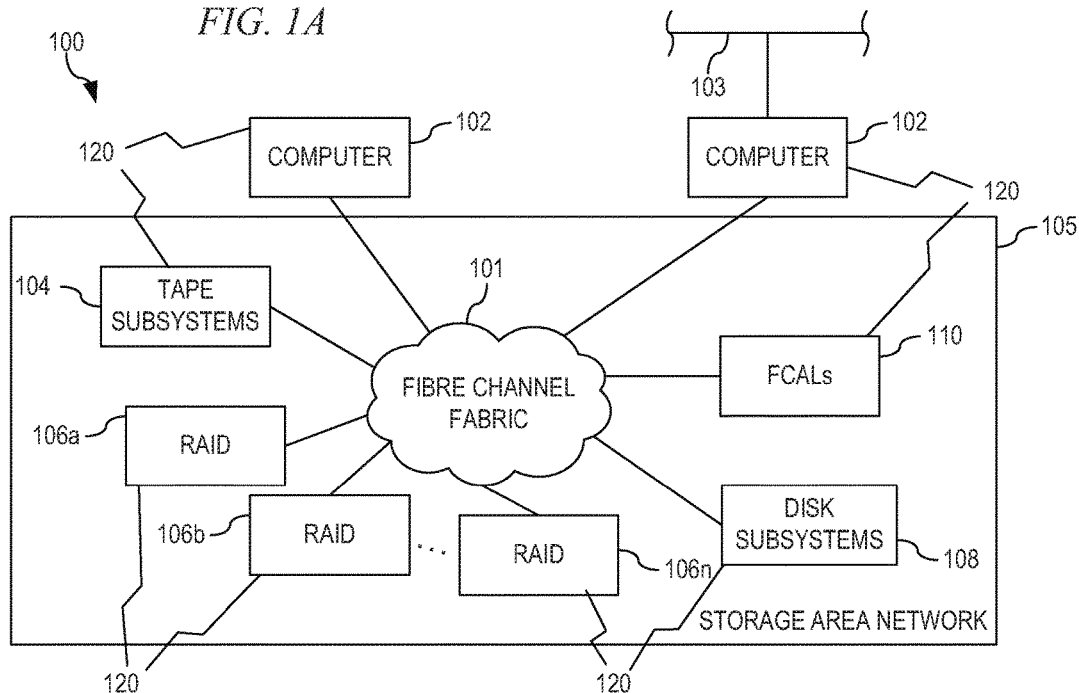
FIGS. 1A and 1B depict one embodiment of a data processing network suitable for implementing the illustrative embodiments.

The illustrative embodiments provide mechanisms for improving error data collection in storage network components. As noted above, a storage network is a dedicated network that provides access to consolidated, block level data storage. A storage network does not provide file abstraction, only block-level operations. However, file systems built on top of storage networks do provide file-level access, and are known as storage network file systems or shared disk file systems. Historically, data centers first created "islands" of Small Computer System Interface (SCSI) disk arrays as direct-attached storage (DAS), each dedicated to an application, and visible as a number of "virtual hard drives" denoted by a logical unit number (LUN), which is a number used to identify a logical unit that is a device addressed by the SCSI protocol or storage network protocols which encapsulate SCSI, such as Fibre Channel or Internet Small Computer Systems Interface (iSCSI). Essentially, a storage network consolidates such storage islands together using a high-speed network.

Operating systems maintain their own file systems on their own dedicated, non-shared LUNs, as though they were local to the operating system. If multiple operating systems were simply to attempt to share a LUN, the multiple operating systems would interfere with each other and quickly corrupt the data. Any planned sharing of data on different computers within a LUN requires advanced solutions, such as storage network file systems or clustered computing. Despite such issues, storage networks help to increase storage capacity utilization, since multiple servers consolidate private storage space onto the disk arrays. Common uses of a storage network include provision of transactionally accessed data that require high-speed block-level access to the hard drives such as email servers, databases, high usage file servers, or the like.

Storage networks often utilize a Fibre Channel fabric topology—an infrastructure specially designed to handle storage communications. Fibre Channel fabric provides faster and more reliable access than higher-level protocols used in Network-attached storage (NAS). A Fibre Channel fabric is similar in concept to a network segment in a local area network. A typical Fibre Channel storage network fabric is made up of a number of Fibre Channel switches.

Today, all major storage network equipment vendors also offer some form of Fibre Channel routing solution, and these bring substantial scalability benefits to the storage network architecture by allowing data to cross between different fabrics without merging them. These offerings use proprietary protocol elements, and the top-level architectures being promoted are radically different.

One of the early problems with Fibre Channel storage networks was that the Fibre Channel switches and other hardware from different manufacturers were not compatible. Although the basic storage protocols FCP were always quite standard, some of the higher-level functions did not inter operate well. Similarly, many host operating systems would react poorly to other operating systems sharing the same fabric. Many solutions were pushed to the market before standards were finalized and vendors have since innovated around the standards. In this kind of environment, the logging of information is essential in case of potential support issues. The most important components of the Fibre Channel fabric are the Fibre Channel switches, which do provide error data logging or error counters for potential error codes.

While current solutions to the deficiencies of the Fibre Channel switches provide error log files, error counters for transmitted frames, and a possibility of error counter reset, the data collected using these solutions do not provide for information as to when the error counters were built up, do not identify the data used in the error counter value capture, do not provide for error counter reset to capture relevant error counter values, and provide error logs that are out of date or already overwritten. Thus, the current solutions make investigation of an error useless due to the fact that the captured error counter values may not be relevant for the actual situation. Error logs are mostly overwritten due to a high frequency of errors not showing any more relevant log information. In these cases, the customer needs to gather a new data collection with previous cleared error counters. The time to capture the second data collection, and sometimes third data collection, often takes an extra day before support may start with the investigation. In a system down event, data loss or access loss associated with the required extra day is not acceptable. Further, with regard to the high data rates of modern storage networks, any information captured for support must not impact the performance and must not take up too much space.

The illustrative embodiments provide mechanisms for improving error data collection in storage network components. In order to improve error data collection, the error data collection mechanisms of the illustrative embodiment provide multiple sets of error counters for each device coupled to a Fibre Channel port of the San component. Each set of error counters is associated with a different error code for the device and each error counter in the set of error counters having an associated different time interval, which allows for determining differences in the error counters after an event compared to previous operations. The error data collection mechanisms also automatically adjust an error log area for a Fibre Channel port according to the selected port speed, which allows faster ports to have a larger error log area to avoid running out of space in an error log area. The error data collection mechanisms replace duplicated sequences of error log entries with a reference to the original sequence to save space in the error log area, to avoid an error log area overflow. The error data collection mechanisms further define clip levels for error counters and/or error log areas and have a monitor component that triggers a notification when a clip level has been reach, which allows for distinguishing between normal operational "noise" and serious error events.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Further, while the remainder of the description is directed to a storage area network (SAN), the illustrative embodiments are not limited to only a SAN an a San is only used as one example of a storage network. That is, the error data collection mechanism of the illustrative embodiment may operate within any type of storage network, for example, a storage area network (SAN), Internet Small Computer System Interface (iSCSI), converged infrastructure, or the like.

Figure 1B:
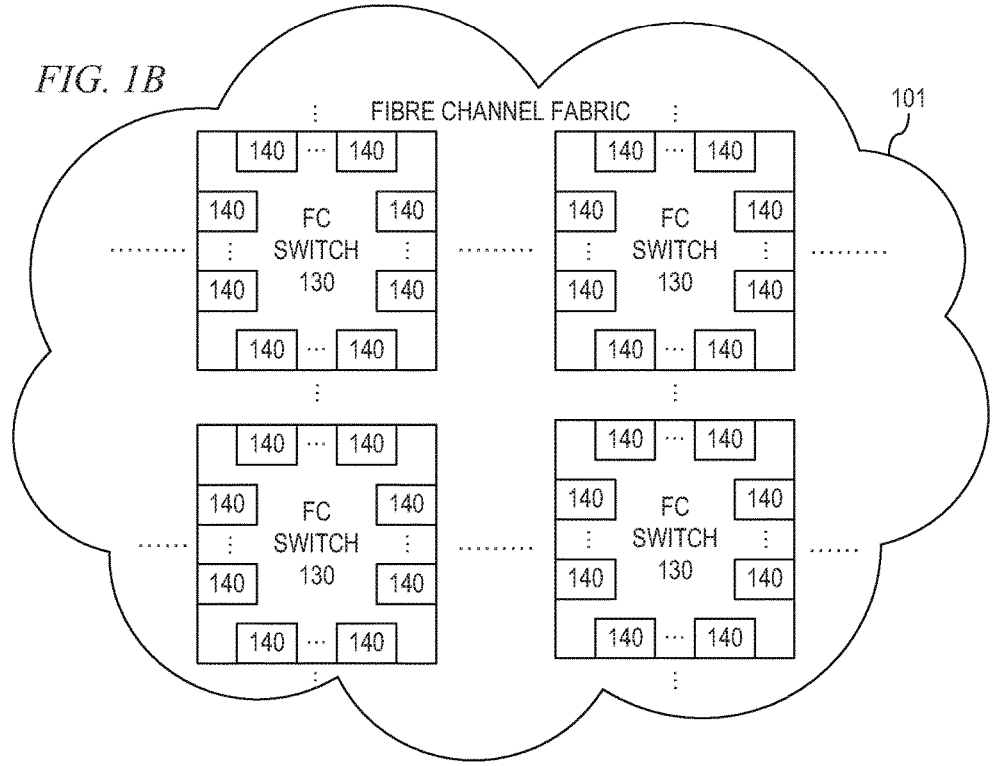
Figure 2:
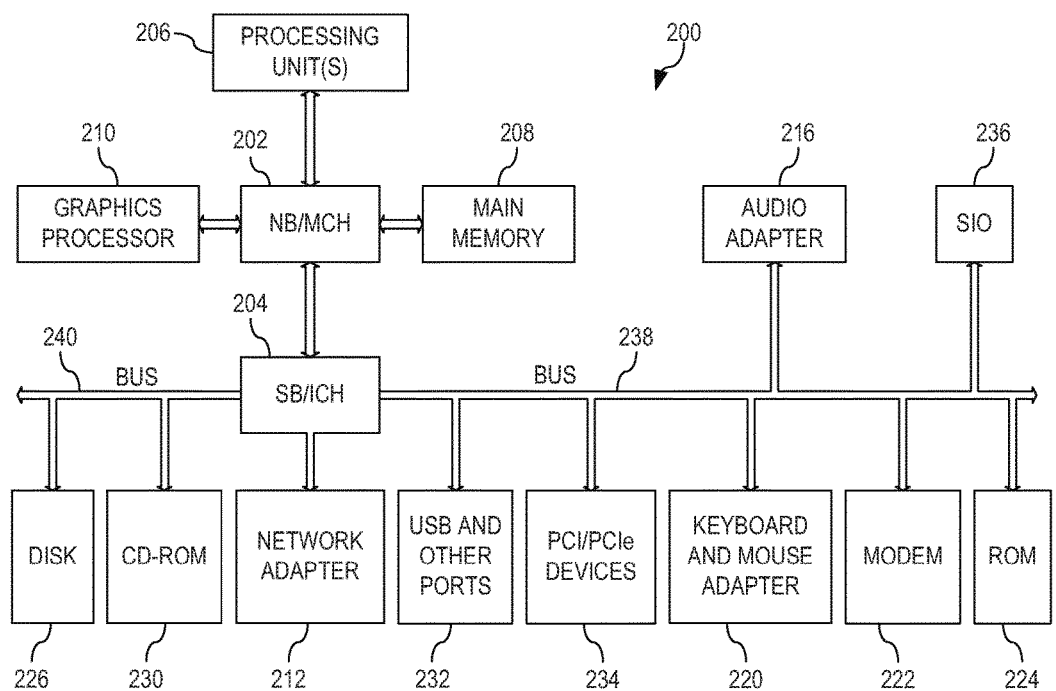
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1A, 1B, and 2 are provided hereafter as example environments in which aspects of the illustrative embodiments may be implemented. It should be appreciated that FIGS. 1A, 1B, and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1A and 1B depict one embodiment of a data processing network 100 suitable for implementing the illustrative embodiments. Data processing network 100 includes a storage area network (SAN) 105 that, in the depicted example, is a Fibre Channel compliant SAN. Fibre Channel is a scalable technology data transfer interface technology that maps several common transport protocols, including Internet Protocol (IP) and Small Computer System Interface (SCSI), allowing it to merge high-speed I/O and networking functionality in a single connectivity technology. Fibre Channel is a set of open standards defined by American National Standards Institute (ANSI) and International Organization for Standardization (ISO). Detailed information regarding the various Fibre Channel standards is available from ANSI Accredited Standards Committee (ASC) X3T11, which is primarily responsible for the Fibre Channel project. These standards are collectively referred to in this specification as the Fibre Channel standard or the Fibre Channel specification. Fibre Channel operates over both copper and fiber optic cabling at distances of up to 10 Kilometers and supports multiple inter-operable topologies including point-to-point, arbitrated-loop, and switching (and combinations thereof).

It should be appreciated that while the illustrative embodiments will be described in terms of using Fibre Channel and a Fibre Channel fabric, the illustrative embodiments are not limited to such. Rather, any interface technology, communication suite, or communication protocol may be utilized with the mechanisms of the illustrative embodiments without departing from the spirit and scope of the present invention. Fibre Channel is only used as an example and is not intended to state or imply any limitation with regard to the types of communication connections or protocols that may be used with the mechanisms of the illustrative embodiments.

The depicted embodiment of SAN 105 includes a set of nodes 120 that are interconnected through a Fibre Channel fabric 101. The nodes 120 of data processing network 100 may include any of a variety of devices or systems including, as shown in FIG. 1A, one or more data processing systems (computers) 102, tape subsystems 104, redundant array of independent disks (RAID) devices 106a-106n, disk subsystems 108, Fibre Channel arbitrated loops (FCAL) 110, and other suitable data storage and data processing devices (not shown). One or more nodes 120 of data processing network 100 may be connected to an external network 103. External network 103 may be a local area network (LAN), a wide area network (WAN), or the like. For example, external network 103 may be an Internet Protocol (IP) supported network, such as the Internet.

With reference to FIG. 1B, Fibre Channel fabric 101 typically includes one of more interconnected Fibre Channel switches 130, each of which includes a set of Fibre Channel ports 140. Each Fibre Channel port 140 typically includes a connector, a transmitter, a receiver, and supporting logic for one end of a Fibre Channel link and may further include a controller. Fibre Channel ports 140 act as repeaters for all other ports 140 in Fibre Channel fabric 101. Fibre Channel ports 140 are described according to their topology type. An F port denotes a switch port (such as are shown in FIG. 1B), an L or NL port denotes an Arbitrated-Loop link (not shown in FIG. 1B), and an FL port denotes an Arbitrated-Loop to Switch connection port (not shown in FIG. 1B). Fibre Channel ports 140 communicate in a standardized manner that is independent of their topology type, allowing Fibre Channel fabric 101 to support inter-topology communication.

As shown in FIGS. 1A and 1B, one or more of the computing devices, e.g., computers 102, tape subsystems 104, RAID devices 106a-106n, disk subsystems 108, Fibre Channel arbitrated loops (FCAL) 110, or the like, may be specifically configured to implement error data collection improvements in SAN components. The configuring of the computing devices may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computers 102, tape subsystems 104, RAID devices 106a-106n, disk subsystems 108, Fibre Channel arbitrated loops (FCAL) 110, or the like, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improving error data collection in SAN components.

As noted above, the mechanisms of the illustrative embodiments utilize specifically configured computing devices, or data processing systems, to perform the operations for improving error data collection. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as computers 102, tape subsystems 104, RAID devices 106a-106n, disk subsystems 108, Fibre Channel arbitrated loops (FCAL) 110, or the like, in FIG. 1A, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to improving error data collection in SAN components.

Those of ordinary skill in the art will appreciate that the hardware in FIGS. 1A, 1B, and 2 may vary depending on the implementation. Other internal hardware or peripheral devices, such as flash memory, equivalent non-volatile memory, or optical disk drives and the like, may be used in addition to or in place of the hardware depicted in FIGS. 1A, 1B, and 2. Also, the processes of the illustrative embodiments may be applied to a multiprocessor data processing system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
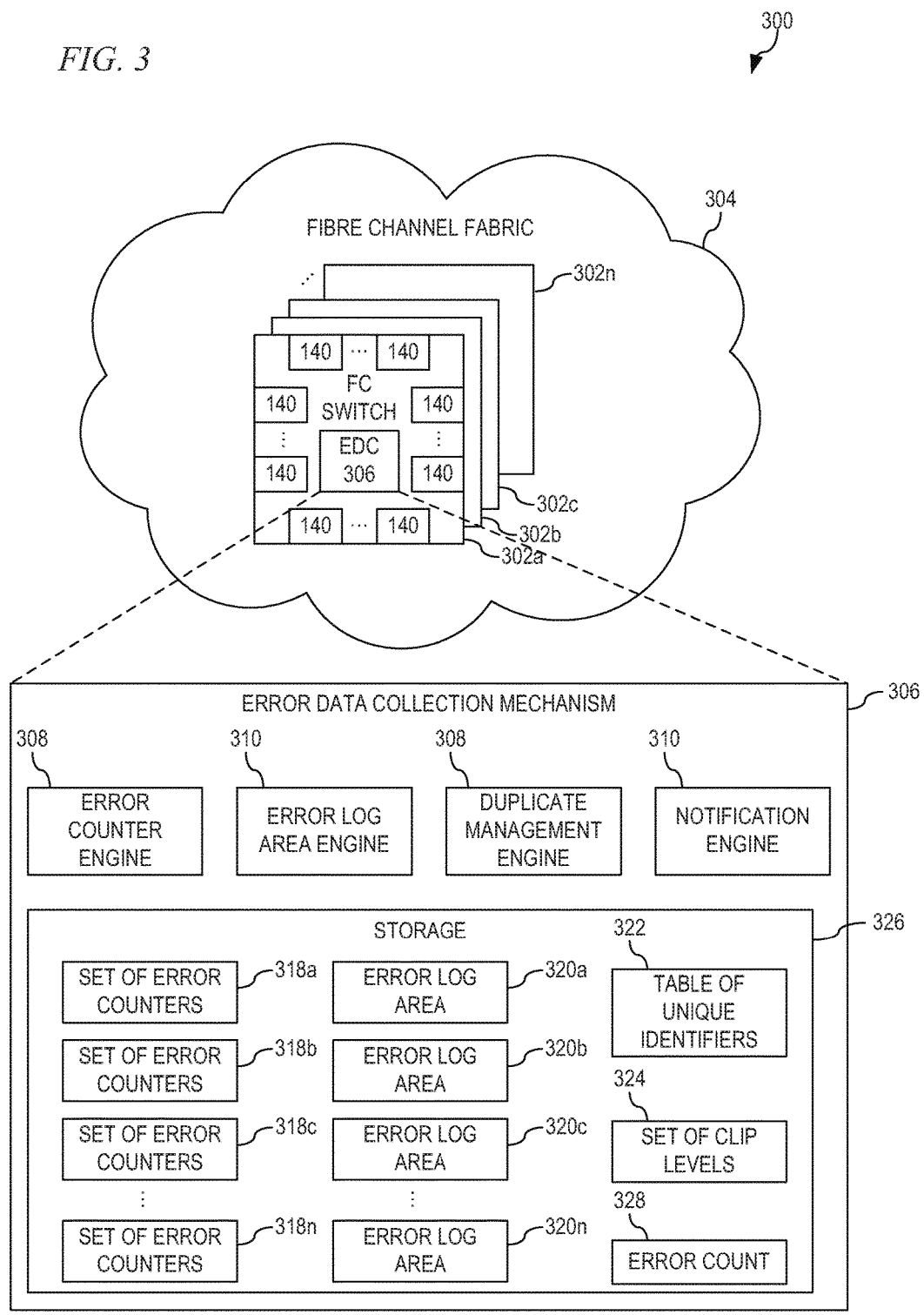
FIG. 3 depicts an error data collection mechanism for improving error data collection in a storage network component in accordance with an illustrative embodiment.

FIG. 3 depicts an error data collection mechanism for improving error data collection in a Storage Area Network (SAN) component in accordance with an illustrative embodiment. Within data processing network 300, each Fibre Channel switch in a set of Fibre Channel switches 302a-302n in Fibre Channel SAN fabric 304 comprises an associated error data collection mechanism 306. Error data collection mechanism 306 comprises error counter engine 308, error log area engine 310, duplicate management engine 312, and notification engine 314. For each Fibre Channel port 316 of a Fibre Channel switch in the set of Fibre Channel switches 302a-302n, error data collection mechanism 306 also comprises a set of error counters 318a-318n for tracking detected errors, an set of error log areas 320a-320n for logging detected errors, a table of unique identifiers 322 for unique identifiers of log sequences in the logs of detected errors the set of error log areas 320a-320n, and a set of clip levels 324 for triggering notifications to a user, all stored in storage 326.

In detail, each set of error counters in the multiple set of error counters 318a-318n associated with the particular Fibre Channel port 316 is associated with a particular error code that may be generated by the device coupled to the Fibre Channel port 316. Further, each error counter in the set of error counters associated with the particular error code has a different associated time interval. For example, in the set of error counters 318a, a first error counter records a number of errors for the last hour, a second error counter records a number of errors for the last 12 hours, a third counter records a number of errors for the last day, a fourth error counter records a number of errors for the last three days, etc. Each set of error counters monitors for its particular error code that may be generated by the device coupled to the particular Fibre Channel port 316, the device being, for example, a data processing system (computer), tape subsystem, redundant array of independent disks (RAID) device, disk subsystem, Fibre Channel arbitrated loop (FCAL), or the like. The set of error counters associated with the device coupled to the particular Fibre Channel port 316 increments by a predetermined value each time its associated error code is generated by the device. Error counter engine 308 monitors the time intervals associated with each of the sets of error counters 318a-318n. When the time interval has elapsed for a particular error counter, error counter engine 308 records the value of the error counter in error count data structure 328 and resets the particular error counter so that the error counter value starts from a predetermined value for the next associated time interval.

Using the above example of a first error counter records a number of errors for the last hour, a second error counter records a number of errors for the last 12 hours, a third counter records a number of errors for the last day, a fourth error counter records a number of errors for the last three days, the following table illustrates how a set of error counters that monitors for a particular code increments over a three day period. That is, if an error code, for example error code 0815, is detected three times in a first hour but then not detected again for over three days then the set of error counters associated with error code 0815 operate as follows:

| Counter | During 1$^{st}$ Hour | After 1$^{st}$ Hour | After 12 hours | After 1$^{st}$ day | After 2$^{nd}$ day | After 3$^{rd}$ day |
|---|---|---|---|---|---|---|
| Last hour | 3 | 0 | 0 | 0 | 0 | 0 |
| Last 12 hours | 3 | 3 | 0 | 0 | 0 | 0 |
| Last day | 3 | 3 | 3 | 0 | 0 | 0 |
| Last 3 days | 3 | 3 | 3 | 3 | 3 | 0 |

For each Fibre Channel port 316 of a Fibre Channel switch in the set of Fibre Channel switches 302a-302n, error log area engine 310 provides a dedicated error log area for logging detected errors in the set of error log areas 320a-320n. Error log area engine 310 monitors the selected port speed for each Fibre Channel port 316 and, according to the observed port speed, error log area engine 310 adjusts the size of the dedicated error log area so that ports with a larger port speed utilize a larger error log area for logging detected errors. One example may be that error log area engine 310 assigns an error log area size proportional to the port speed of the Fibre Channel port 316.

Each time an error is logged in the error log area associated with the Fibre Channel port 316, duplicate management engine 312 monitors for duplicated error log sequences. In analysis of the errors logged in the error log area, duplicate management engine 312 generates a unique identifier for each log sequence, the log sequence being a portion of a log entry, an entire log entry, a series of log entries, or the like. The unique identifier may be, for example, a hash of the log sequence although other means of generating the unique identifier may be utilized. In monitoring for duplicated log sequences in the error log area, duplicate management engine 312 utilizes a table of unique identifiers 322 to determine whether the generated unique identifier matches a unique identifier in the table of unique identifiers 322. If duplicate management engine 312 fails to detect another log sequence with a matching unique identifier, duplicate management engine 312 adds the generated log sequence to the table of unique identifiers 322. If duplicate management engine 312 detects another log sequence with a matching unique identifier, duplicate management engine 312 replaces the log sequence associated with the currently generated unique identifier in the associated log area with a reference to the first log sequence in order to save space in the error log area.

Finally, notification engine 314 utilizes a set of clip levels 324 associated with a particular Fibre Channel port 316 for triggering notifications to a user. When a clip level is reached, notification engine 314 triggers an associated notification to the user that may include associated support data, such as an identification of the error counter, a rate at which the error counter is increasing, a current value of the error counter, a current value of all error counters, a rate of increase of all error counters, the error log area size, a rate of increase of the error log area, or the like. Therefore, examples of a clip level in the set of clip levels 324 may include but are not limited to:

The absolute value of an error counter in the set of error counters 318a-318n. Once the reaches the clip level, notification engine 314 sends an associated notification to the user so that the associated errors may be addressed.

The relative increase rate of an error counter in the set of error counters 318a-318n. If the error counter increases more than a defined rate, notification engine 314 sends an associated notification to the user so that the associated errors may be addressed.

The cumulative value of all error counters in the set of error counters 318a-318n. Once the sum of all error counters reaches the clip level notification engine 314 sends an associated notification to the user so that the associated errors may be addressed.

The cumulative increase rate of all error counters in the set of error counters 318a-318n. Once the sum of all error counter increase rate reaches a clip level, notification engine 314 sends an associated notification to the user so that the associated errors may be addressed.

The error log area size. If an error log area reaches a defined size, notification engine 314 sends an associated notification to the user so that the associated errors may be addressed.

The error log area increase rate. If the rate of error log entries in the error log area reaches the clip level, notification engine 314 sends an associated notification to the user so that the associated errors may be addressed.

Therefore, notification engine 314 monitors the set of error counters 318a-318n and the error log area in the set of error log areas 320*a*-320*n* associated with each of the Fibre Channel ports 316 on the each Fibre Channel switch in the set of Fibre Channel switches 302*a*-302*n* and triggers notifications when one or more defined clip levels the set of clip levels 324 have been reached. The notifications then cause a user that receives the notification to address the errors associated with the device attached to the particular Fibre Channel port 316.

Thus, the illustrative embodiments provide an error data collection mechanism allows for faster network analysis and therefore straight forward problem solving. That is, using the error counter and the error log areas, which are populated as defined above, in conjunction with the predefined clip levels for the error counters and/or error log areas, when a clip level has been reached, a notification is sent out to a user that clearly distinguishes between normal operational "noise" and serious error events.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
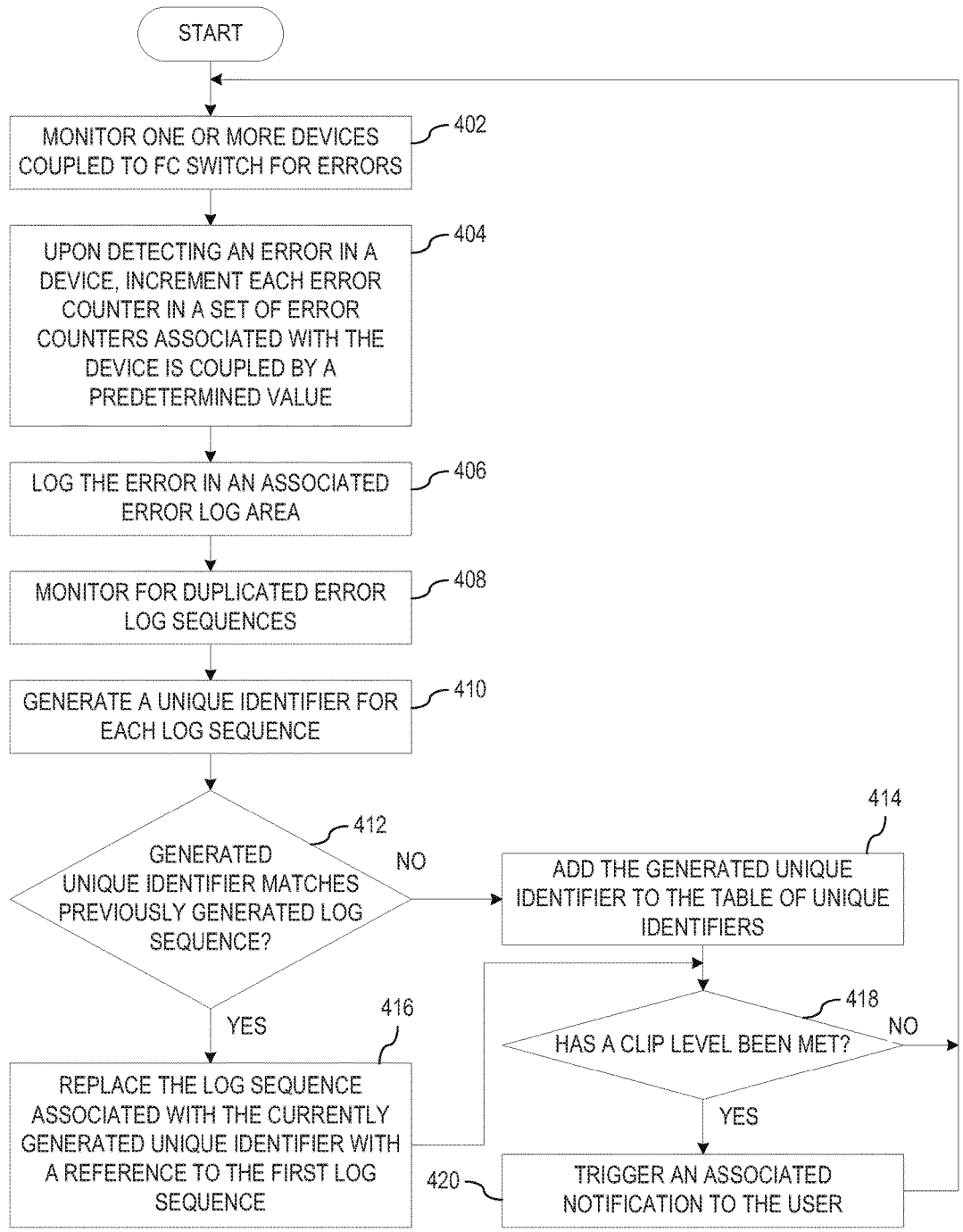
FIG. 4 depicts an exemplary flowchart of the operation performed by the error data collection mechanism of the illustrative embodiments.

FIG. 4 depicts an exemplary flowchart of the operation performed by the error data collection mechanism of the illustrative embodiments. As the operation begins, error detection logic in a Fibre Channel switch monitors one or more devices coupled to the Fibre Channel ports of the Fibre Channel switch for errors (step 402). The device may include, but are not limited to, a data processing system (computer), tape subsystem, redundant array of independent disks (RAID) device, disk subsystem, Fibre Channel arbitrated loop (FCAL), or the like. Each time the error detection logic identifies an error associated with a particular device coupled to an associated Fibre Channel port, each error counter in a set of error counters of the error data collection mechanism and associated with the Fibre Channel port increments by a predetermined value (step 404).

Additionally, each time the error detection logic identifies an error associated with a particular device coupled to an associated Fibre Channel port, the error detection logic logs the error in an error log area associated with the Fibre Channel port (step 406). The size of the error log area is controlled by an error log area engine of the error data collection mechanism. The error log area engine monitors the selected port speed for each Fibre Channel port and, according to the observed port speed, the error log area engine adjusts the size of the dedicated error log area so that ports with a larger port speed utilize a larger error log area for logging detected errors.

Each time an error is logged in the error log area associated with the Fibre Channel port, a duplicate management engine of the error data collection mechanism monitors for duplicated log sequences (step 408). In analysis of the errors logged in the error log area, the duplicate management engine generates a unique identifier for each log sequence (step 410), the log sequence being a portion of a log entry, an entire log entry, a series of log entries, or the like. The unique identifier may be, for example, a hash of the log sequence although other means of generating the unique identifier may be utilized. In monitoring for duplicated log sequences, the duplicate management engine utilizes a table of unique identifiers to determine whether the generated unique identifier matches a unique identifier in the table of unique identifiers (step 412). If at step 412 the duplicate management engine fails to detect another log sequence with a matching unique identifier, the duplicate management engine adds the generated unique identifier to the table of unique identifiers (step 414). If at step 412 the duplicate management engine detects another log sequence with a matching unique identifier, the duplicate management engine replaces the log sequence associated with the currently generated unique identifier in the associated error log area with a reference to the first log sequence in order to save space in the error log area (step 416).

From steps 414 and 416, a notification engine in the error data collection engine, monitors each error log area and each error counter in the set of error counters associated with each Fibre Channel port in the Fibre Channel switch to determine whether a clip level in a set of clip levels has been met (step 418). If at step 418 the notification engine determines that a clip level in the set of clip levels has not been met, then the operation returns to step 402. If at step 418 the notification engine determines that a clip level in the set of clip levels has been met, then the notification engine triggers an associated notification to the user (step 420) that may include associated support data, such as an identification of the error counter, a rate at which the error counter is increasing, a current value of the error counter, a current value of all error counters, a rate of increase of all error counters, the error log area size, a rate of increase of the error log area, or the like. The operation returns to step 402 thereafter.

Figure 5:
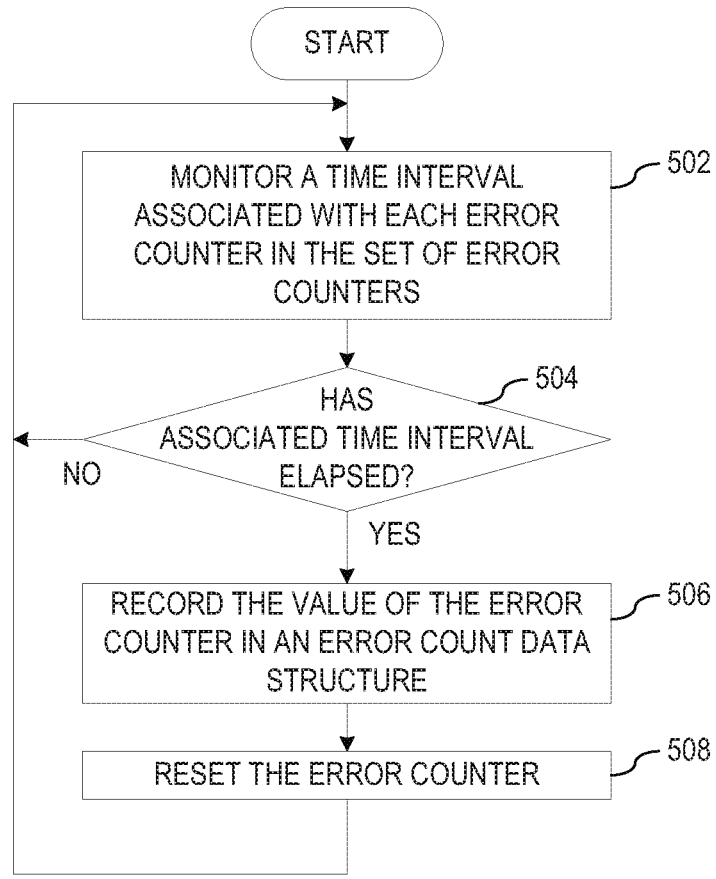
FIG. 5 depicts an exemplary flowchart of the operation performed by the error data collection mechanism in resetting an error counter in the set of error counters of the illustrative embodiments.

FIG. 5 depicts an exemplary flowchart of the operation performed by the error data collection mechanism in resetting an error counter in the set of error counters of the illustrative embodiments. As the operation begins, as each error counter in a set of error counters of the error data collection mechanism increments by the predetermined value, an error counter engine in the error data collection mechanism monitors a time interval associated with each error counter in the set of error counters (step 502). For each error counter, the error counter engine determines whether an associated time interval has elapsed (step 504). If at step 504 the error counter engine determines that the associated time interval has not elapsed, then the operation returns to step 502. If at step 504 the error counter engine determines that the associated time interval has elapsed, then the error counter engine records the value of the error counter in an error count data structure (step 506) and resets the error counter (step 508) so that the error counter value starts from a predetermined value for the next associated time interval. The operation returns to step 502 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for improving error data collection in SAN components. The error data collection mechanism provides multiple sets of error counters, each error counter associated a different time interval, which allows for determining differences in the error counters after an event compared to previous operations. The error data collection mechanism also automatically adjust an error log area for a SAN port according to the selected port speed, which allows faster ports to have a larger error log area to avoid running out of space in an error log area. The error data collection mechanism replaces duplicated sequences of error log entries with a reference to the original sequence to save space in the error log area, to avoid an error log area overflow. The error data collection mechanism further defines clip levels for error counters or error log areas and has a monitor component that triggers a notification when a clip level has been reach, which allows for distinguishing between normal operational "noise" and serious error events.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for improving error data collection in a storage network component, the method comprising:
   each time an associated error code generated by a device coupled to the storage network component occurs:
      incrementing, by an error data collection mechanism, each error counter in a set of error counters associated with the error code generated by the device in the storage network component; and
      logging, by the error data collection mechanism, the error in an error log area associated with the device in the storage network component; and
   responsive to one or more clip levels in a set of clip levels being met, triggering, by the error data collection mechanism, a notification associated with the one or more clip levels that are met thereby causing the error associated with the device to be addressed, wherein the set of clip levels is associated with the error log area and each error counter in the set of error counters associated with the error code generated by the device.

2. The method of claim 1, for each log sequence associated with the error in the error log area:
   generating, by the error data collection mechanism, a unique identifier for the log sequence;
   determining, by the error data collection mechanism, whether the generated unique identifier matches a previously generated unique identifier in a table of unique identifiers;
   responsive to the generated unique identifier failing to match one of any previously generated unique identifier in the table of unique identifiers, adding, by the error data collection mechanism, the generated unique identifier to the table of unique identifiers; and
   responsive to the generated unique identifier matching a previously generated unique identifier in the table of unique identifiers, replacing, by the error data collection mechanism, the log sequence associated with the generated unique identifier in the error log area with a reference to a first log sequence associated with the previously generated unique identifier.

3. The method of claim 2, wherein the log sequence is one of a portion of a log entry, an entire log entry, or a series of log entries.

4. The method of claim 1, wherein a size of the error log area is determined by:
   monitoring, by the error data collection mechanism, a selected port speed for a Fibre Channel port of the storage network component to which the device is coupled; and
   according to the selected port speed, adjusting, by the error data collection mechanism, the size of the error log area.

5. The method of claim 4, wherein a Fibre Channel port ports with a larger port speed utilizes an error log area that is larger than a Fibre Channel port with a smaller port speed.

6. The method of claim 1, wherein in the notification includes support data and wherein the support data includes one or more of an identification of the error counter, a rate at which the error counter is increasing, a current value of the error counter, a current value of all error counters, a rate of increase of all error counters, the error log area size, or a rate of increase of the error log area.

7. The method of claim 1, wherein a clip level in the set of clip levels is one of an absolute value of an error counter in the set of error counters, a relative increase rate of an error counter in the set of error counters, a cumulative value of all error counters in the set of error counters, a cumulative increase rate of all error counters in the set of error counters, an error log area, or an error log area increase rate.

8. The method of claim 1, wherein each error counter in the set of error counters associated with the device in the storage network component has a different associated time interval and wherein each error counter is reset by the method comprising:
   monitoring, by the error data collection mechanism, the time interval associated with the error counter
   determining, by the error data collection mechanism, whether the time interval has elapsed; and
   responsive to the time interval elapsing, recording, by the error data collection mechanism, a value of the error counter in an error count data structure and resetting, by the error data collection mechanism the error counter to a predetermined value.

9. A computer program product comprising a computer readable storage medium having a computer readable program stored therein, wherein the computer readable program, when executed on a computing device, causes the computing device to:
  each time an associated error code generated by a device coupled to a storage network component occurs:
    increment each error counter in a set of error counters associated with the error code generated by the device in the storage network component; and
    log the error in an error log area associated with the device in the storage network component; and
  responsive to one or more clip levels in a set of clip levels being met, trigger a notification associated with the one or more clip levels that are met thereby causing the error associated with the device to be addressed, wherein the set of clip levels is associated with the error log area and each error counter in the set of error counters associated with the error code generated by the device.

10. The computer program product of claim 9, wherein the computer readable medium further causes, for each log sequence associated with the error in the error log area, the computing device to:
  generate a unique identifier for the log sequence;
  determine whether the generated unique identifier matches a previously generated unique identifier in a table of unique identifiers;
  responsive to the generated unique identifier failing to match one of any previously generated unique identifier in the table of unique identifiers, add the generated unique identifier to the table of unique identifiers; and
  responsive to the generated unique identifier matching a previously generated unique identifier in the table of unique identifiers, replace the log sequence associated with the generated unique identifier in the error log area with a reference to a first log sequence associated with the previously generated unique identifier.

11. The computer program product of claim 9, wherein the computer readable program determines a size of the error log area by causing the computing device to:
  monitor a selected port speed for a Fibre Channel port of the storage network component to which the device is coupled; and
  according to the selected port speed, adjust the size of the error log area.

12. The computer program product of claim 9, wherein in the notification includes support data and wherein the support data includes one or more of an identification of the error counter, a rate at which the error counter is increasing, a current value of the error counter, a current value of all error counters, a rate of increase of all error counters, the error log area size, or a rate of increase of the error log area.

13. The computer program product of claim 9, wherein a clip level in the set of clip levels is one of an absolute value of an error counter in the set of error counters, a relative increase rate of an error counter in the set of error counters, a cumulative value of all error counters in the set of error counters, a cumulative increase rate of all error counters in the set of error counters, an error log area, or an error log area increase rate.

14. The computer program product of claim 9, wherein each error counter in the set of error counters associated with the device in the storage network component has a different associated time interval and wherein each error counter is reset by the computer readable program causing the computing device to:
  monitor the time interval associated with the error counter
  determine whether the time interval has elapsed; and
  responsive to the time interval elapsing, record a value of the error counter in an error count data structure and resetting, by the error data collection mechanism the error counter to a predetermined value.

15. An apparatus comprising:
  a processor, and
  a memory coupled to the processor, wherein the memory comprises instructions which, when executed by the processor, cause the processor to:
  each time an associated error code generated by a device coupled to a storage network component occurs:
    each error counter in a set of error counters associated with the error code generated by the device in the storage network component; and
    log the error in an error log area associated with the device in the storage network component; and
  responsive to one or more clip levels in a set of clip levels being met, trigger a notification associated with the one or more clip levels that are met thereby causing the error associated with the device to be addressed, wherein the set of clip levels is associated with the error log area and each error counter in the set of error counters associated with the error code generated by the device.

16. The apparatus of claim 15, wherein the instructions further cause, for each log sequence associated with the error in the error log area, the processor to:
  generate a unique identifier for the log sequence;
  determine whether the generated unique identifier matches a previously generated unique identifier in a table of unique identifiers;
  responsive to the generated unique identifier failing to match one of any previously generated unique identifier in the table of unique identifiers, add the generated unique identifier to the table of unique identifiers; and
  responsive to the generated unique identifier matching a previously generated unique identifier in the table of unique identifiers, replace the log sequence associated with the generated unique identifier in the error log area with a reference to a first log sequence associated with the previously generated unique identifier.

17. The apparatus of claim 15, wherein the instructions determine a size of the error log area by causing the processor to:
  monitor a selected port speed for a Fibre Channel port of the storage network component to which the device is coupled; and
  according to the selected port speed, adjust the size of the error log area.

18. The apparatus of claim 15, wherein in the notification includes support data and wherein the support data includes one or more of an identification of the error counter, a rate at which the error counter is increasing, a current value of the error counter, a current value of all error counters, a rate of increase of all error counters, the error log area size, or a rate of increase of the error log area.

19. The apparatus of claim 15, wherein a clip level in the set of clip levels is one of an absolute value of an error counter in the set of error counters, a relative increase rate of an error counter in the set of error counters, a cumulative value of all error counters in the set of error counters, a cumulative increase rate of all error counters in the set of error counters, an error log area, or an error log area increase rate.

20. The apparatus of claim 15, wherein each error counter in the set of error counters associated with the device in the storage network component has a different associated time interval and wherein each error counter is reset by the instructions causing the processor to:
- monitor the time interval associated with the error counter
- determine whether the time interval has elapsed; and
- responsive to the time interval elapsing, record a value of the error counter in an error count data structure and resetting, by the error data collection mechanism the error counter to a predetermined value.

\* \* \* \* \*